United States Patent [19]
Atkins et al.

[11] Patent Number: 5,500,031
[45] Date of Patent: Mar. 19, 1996

[54] METHOD FOR INCREASING THE INDEX OF REFRACTION OF A GLASSY MATERIAL

[75] Inventors: Robert M. Atkins, Millington; Paul J. Lemaire, Madison; Victor Mizrahi, Bedminster; Kenneth L. Walker, New Providence, all of N.J.

[73] Assignee: AT&T Corp., Murray Hill, N.J.

[21] Appl. No.: 357,353

[22] Filed: Dec. 14, 1994

Related U.S. Application Data

[63] Continuation of Ser. No. 56,329, Apr. 30, 1993, abandoned, which is a continuation-in-part of Ser. No. 10,237, Jan. 28, 1993, Pat. No. 5,287,427, which is a continuation-in-part of Ser. No. 878,802, May 5, 1992, Pat. No. 5,235,659.

[51] Int. Cl.$^6$ .................................................. C03B 32/00
[52] U.S. Cl. ................ 65/386; 65/387; 65/392; 65/424; 65/425; 65/30.1; 65/32.1
[58] Field of Search ............................ 65/386, 387, 392, 65/426, 429, 424, 32 T, 425, 30.1

[56] References Cited

U.S. PATENT DOCUMENTS

| | | | |
|---|---|---|---|
| 4,504,297 | 3/1985 | Kosinski et al. | 65/3.11 |
| 4,515,612 | 5/1985 | Burrus et al. | 65/3.12 |
| 4,856,859 | 8/1989 | Imoto | 65/3.11 X |
| 5,235,659 | 8/1993 | Atkins et al. | 385/124 |
| 5,267,343 | 11/1993 | Lyons et al. | 65/30.12 |

FOREIGN PATENT DOCUMENTS

| | | | |
|---|---|---|---|
| 2843276 | 9/1979 | Germany | 65/3.11 |
| WO-A-86 01303 | 2/1986 | WIPO | G02B 5/18 |

OTHER PUBLICATIONS

Maxwell, G. D. et al "UV Written 13dB Reflection in Hydrog. LowLoss Planar Silica Waveguides", Electronic Letters, vol. 29 #5 pp. 425–426 (1993).

Atkins, R. M. et al "Effects of Elevated Temperature Hydrogen Exposure on Short-Wavelength Optical Losses and Defect Concentrations in Germanosilicate Optical Fibers" J. Appl. Phys. vol. 72 pp. 344–348 (1992).

G. Meltz et al. "International Workshop on Photoinduced Self-Organization Effects in Optical Fiber" *Proc. SPIE*-The International Society for Optical Engineering vol. 1516, pp. 185–199 (1991).

Lemaire et al. "High Pressure H÷2 Loading As A Technique For Achieving Ultrahigh UV Potosensitivity And Thermal Sensitivity in GeO÷2 Doped Optical Fibres" *Electronics Lettes* vol. 29, No. 13, pp. 1191–1193 (1993).

C. H. Henry, et al. "Glass Waveguides on Silicon for Hybrid Optical Packaging" *J. of Lightwave Tech.* vol. 7, No. 10, pp. 1530–1539 (1989).

Primary Examiner—David A. Simmons
Assistant Examiner—John Hoffmann
Attorney, Agent, or Firm—Glen E. Books

[57] ABSTRACT

In accordance with the invention, the index of refraction of a glassy material is increased by treating the material with hydrogen and applying heat. Specifically, the glass is exposed to hydrogen or deuterium at pressure in the range 14–11,000 p.s.i. and a temperature in the range 21°–150° C. for a time sufficient for the hydrogen to diffuse into the glass. The glass is then subjected to heat in excess of about 500° C., as by application of a flame or infrared radiation. The duration of heating can be less than a second. The result is a substantial and long-lived increase in the normalized refractive index. For example, flame heating of $H_2$ loaded commercial $GeO_2$ doped optical fibers (AT&T Accutether single mode fiber) has produced normalized index changes $\Delta n/n$ of $4\times10^{-3}$. This process can be used to make and adjust a variety of optical waveguide devices.

6 Claims, 3 Drawing Sheets

METHOD FOR INCREASING THE INDEX OF REFRACTION OF A GLASSY MATERIAL

CROSS-REFERENCE TO RELATED APPLICATION

This application is a continuation of application Ser. No. 08/056329, filed on Apr. 30, 1993. Abandoned, which application is a continuation-in-part of U.S. Pat. application Ser. No. 08/010,237, filed Jan. 28, 1993, now U.S. Pat. No. 5,287,427 which, in turn is a continuation-in-part of application Ser. No. 07/878,802, filed May 5, 1992 now U.S. Pat. No. 5,235,659.

FIELD OF THE INVENTION

This invention relates to a method for increasing the index of refraction of a glassy material. It is particularly useful in the fabrication of optical devices such as optical waveguides, gratings and lasers.

BACKGROUND OF THE INVENTION

It is known that in-line optical fiber gratings can be formed by applying two interfering beams of ultraviolet radiation to a glass waveguide structure. See, for example, U.S. Pat. Nos. 4,807,950 and 4,725,110 which are incorporated herein by reference. Typically these gratings are formed in Ge-doped optical fiber.

The present applicants have discovered and disclosed in the aforementioned parent applications that the index-changing effect of actinic (UV) radiation can be enhanced by treating the glass with hydrogen or deuterium.

The present application is predicated upon the further discovery that in hydrogen or deuterium treated glass (hereinafter generically referred to as hydrogen-treated glass), the index of refraction can be increased not only by actinic radiation, but also by the application of heat.

SUMMARY OF THE INVENTION

In accordance with the invention, the index of refraction of a glassy material is increased by treating the material with hydrogen and applying heat. Specifically, the glass is exposed to hydrogen or deuterium at pressure in the range 14–11,000 p.s.i. and a temperature in the range 21°–150° C. for a time sufficient for the hydrogen to diffuse into the glass. The glass is then subjected to heat in excess of about 500° C., as by application of a flame or infrared radiation. The duration of heating is preferably a second or less. The result is a substantial and long-lived increase in the normalized refractive index. For example, flame heating of $H_2$ loaded commercial $GeO_2$ doped optical fibers (AT&T Accutether single mode fiber) has produced normalized index changes $\Delta n/n$ of $4 \times 10^{-3}$. This process can be used to make and adjust a variety of optical waveguide devices.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for graphical illustrations, are not to scale.

DETAILED DESCRIPTION

Figure 1:
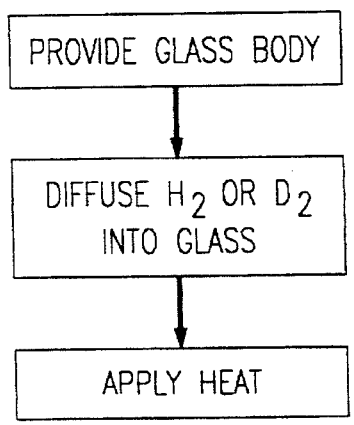
FIG. 1 is a block diagram showing the steps of an exemplary process for increasing the index of refraction of a glassy material.

Referring to the drawings, FIG. 1 illustrates the steps of an exemplary process for increasing the index of refraction of a glassy material.

Figure 2:
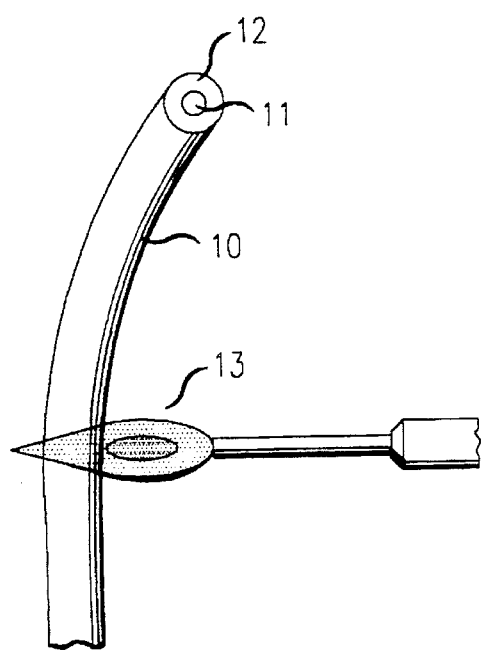
FIGS. 2 and 3 illustrate glass bodies upon which the inventive process can be used.
Figure 3:
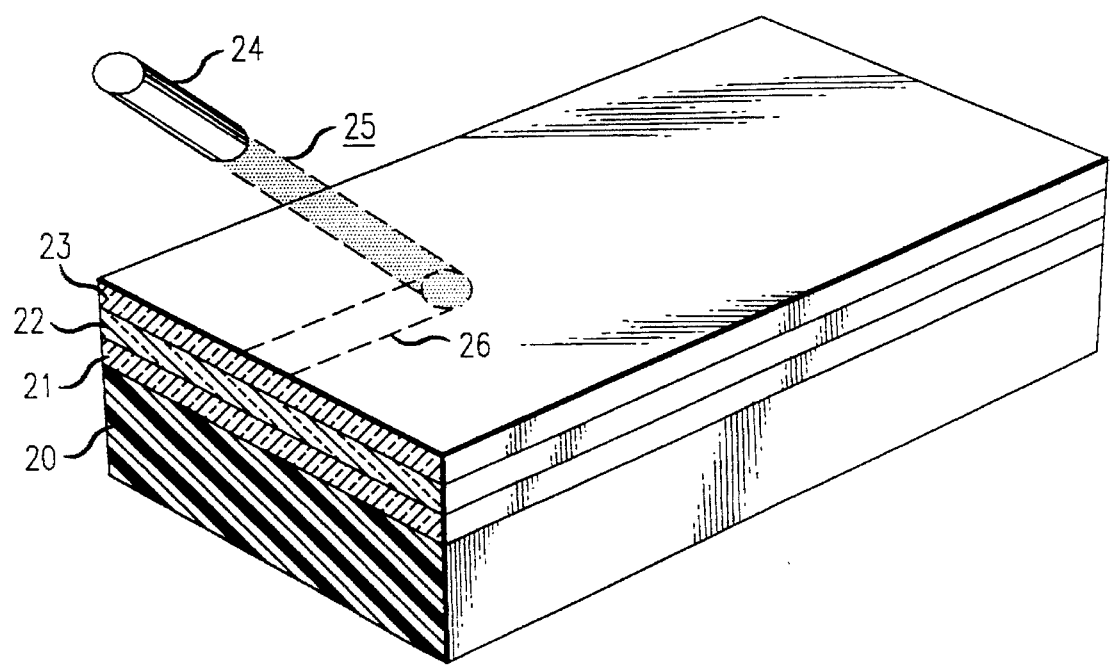

As shown in FIG. 1, the first step is to provide a body of glass. The body can be any of a wide variety of forms. Forms particularly preferred for this process are illustrated in FIGS. 2 and 3. They include optical fiber and substrate supported thin layers for planar optical waveguide devices. Preferably the glass is a transparent glass doped with germanium such as $GeO_2$ doped silica. However, the method has been found to work in other types of transparent glass such as P-doped silica and P-Al doped silica. Typical $GeO_2$ concentrations in silica are in the range 3–20 mole % $GeO_2$, with higher index changes observed for higher $GeO_2$ concentrations.

The next step shown in FIG. 1 is to diffuse hydrogen into the glass body at least in those regions whose refractive index is to be increased. Preferably this diffusion is effected by exposing the body to hydrogen (or deuterium) gas at a pressure in the range 14–11,000 p.s.i. Advantageously, the diffusion takes place at low to moderate temperatures in the range 21°–150° C.

Diffusion times depend on the temperature and the thickness of the glass to be loaded with hydrogen. Typical diffusion times for standard sized optical fibers are about 12 days at 21° C. or about 10 hours at 100° C. More generally, the time required for the $H_2$ loading of a fiber of radius r is proportional to $r^2$ and inversely proportional to the diffusivity of $H_2$ in the glass.

In $GeO_2$ doped glass the amount (mole %) of $H_2$ loaded is believed optimally proportional to the mole % of $GeO_2$ dopant. Typical $GeO_2$ amounts in silica are on the order of 3–20 mole percent. Accordingly, the $H_2$ levels needed to achieve maximum $\Delta n$'s will vary proportionally. Since the heating induced reactions usually occur only at localized portions of the glass body, it is possible to make use of $H_2$ that can diffuse from surrounding areas. For example, for a single mode fiber a significant amount of $H_2$ can diffuse from the cladding material into the $GeO_2$ doped core, thus permitting maximum index changes to be achieved in the core even though the $H_2$ concentration may be less than the $GeO_2$ concentration. It is believed that the pertinent reaction involves one H atom per Ge atom. In fabrication, the amount of loaded hydrogen at equilibrium varies jointly with the pressure of hydrogen and jointly with an exponential factor exp $$\left( \frac{2.07 \text{ Kcal/mole}}{RT} \right).$$

The third step shown in FIG. 1 is to heat the hydrogen-loaded glass. Preferably the glass is heated rapidly to a temperature in excess of about 500° C. Low temperatures on the order of 300° C. are ineffective and gradual heating at low temperatures (over several minutes rather than seconds) can cause the hydrogen to diffuse out of the glass without increasing the refractive index.

Any rapid heating method can be used to achieve an index change. Flame heating has been used with optical fibers, and radiative heating, as from a $CO_2$ laser, is advantageous for planar waveguide structures. The heating can be either general or local. Local heating, as by infrared radiation from a focused $CO_2$ laser, can define local regions of enhanced refractive index, thereby defining localized waveguiding structures or adjusting the path length of critical light guiding regions such as laser cavities. Alternatively fiber or waveguide structures can be locally heated at a plurality of periodically spaced points along the pathlength to define a grating structure.

The preferred application of the invention is for increasing the refractive index of selected portions of glass fiber or a glass layer to form or modify optical waveguide structures. An optical waveguide generally comprises an elongated glass structure including a core of relatively high refractive index glass and a cladding of lower refractive index glass at least partially surrounding the core. The dimensions of the core are chosen and adapted for transmitting in the longitudinal direction electromagnetic radiation of optical wavelength typically in the range 0.4 to 1.7 micrometers. FIG. 2 illustrates such a waveguiding body in the form of an optical fiber 10 having a central cylindrical core 11 surrounded by a concentric cladding 12. As shown, a convenient way of applying heat to a length of such a fiber is by passing it through a flame 13.

FIG. 3 illustrates a waveguiding body in planar form, typically comprising a substrate 20, a thin cladding layer 21 disposed upon the substrate, a core glass layer 22 on the cladding and a top cladding layer 23. The basic structure of conventional planar waveguides is described in C. H. Henry et al., "Glass Waveguides on Silicon for Hybrid Optical Packaging", 7 *J. Lightwave Technol.*, pp. 1530–39 (1989). Typically, all but a thin stripe of the core layer is etched away prior to application of the top cladding in order to define the waveguiding region, and while the inventive process can be used with such devices (as to define gratings), we have here shown the core glass as a planar layer to illustrate the use of the inventive process in defining waveguide patterns.

As shown, a convenient way to heat selected regions of a planar waveguide structure is to direct a laser 24, such as a $CO_2$ laser, to apply infrared radiation 25 onto selected portions 26 of the structure. Advantageously, one can apply the radiation to selected portions defining a desired waveguide configuration. Thus, the waveguide configuration can be defined by selective heating of the layer 22 without etching. If very fine configurations are desired, a reflective mask such as a layer of gold (not shown) can be placed between the top cladding and the laser so that radiation for heating the core arrives selectively from open regions in the reflective mask.

The operation and applications of the invention can be understood in greater detail by consideration of the following specific examples.

EXAMPLE 1

An AT&T Accutether optical fiber was loaded with $H_2$ to a concentration of about 1.9 mole % $H_2$ and its refractive index profile was measured. A 64 mm length of the fiber was then heated by rapidly passing a small (3 mm wide) flame over the fiber in about 12 s. The refractive index profile was again measured.

Figure 4:
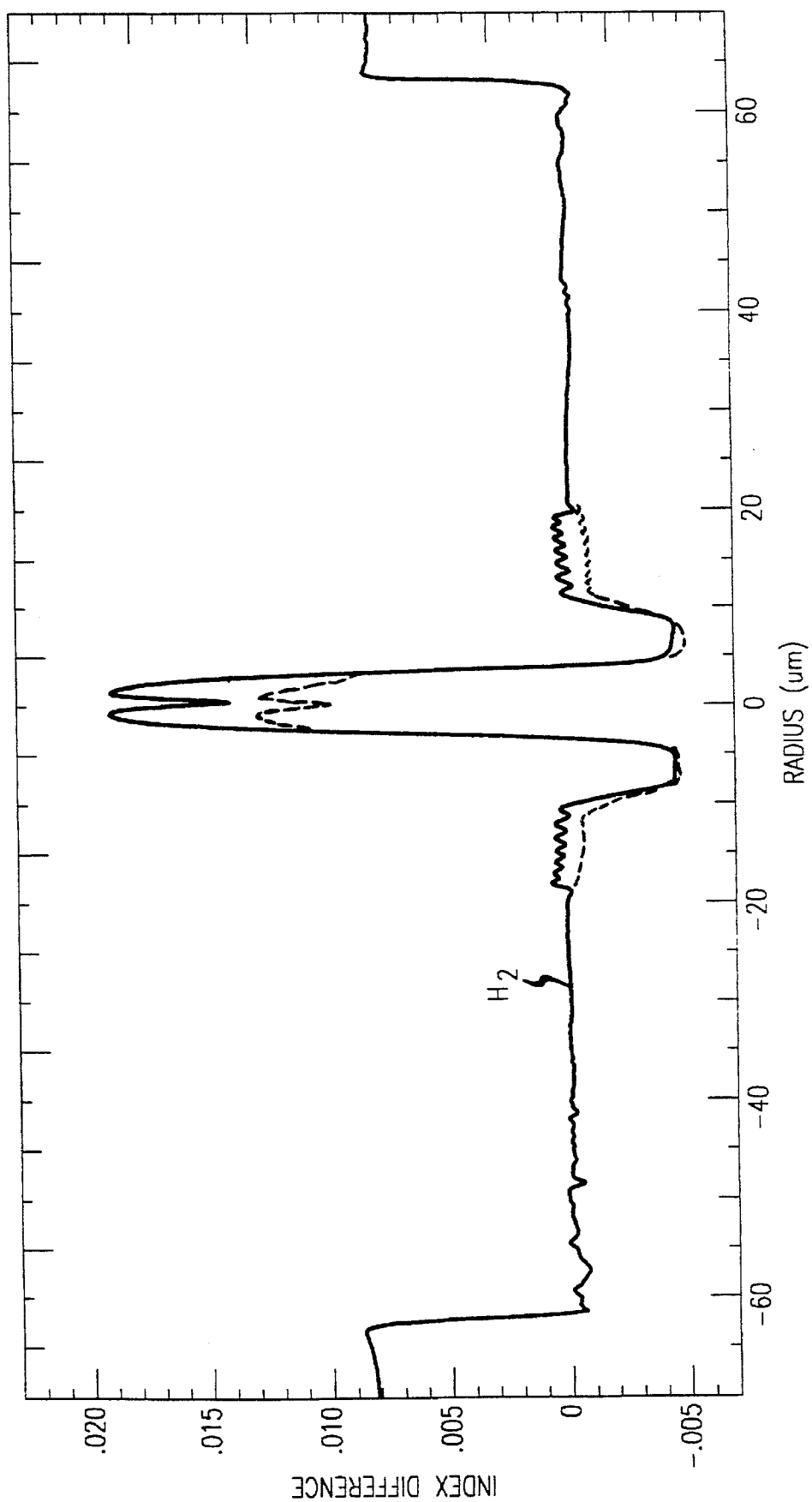
FIGS. 4 and 5 are graphical illustrations demonstrating the effect of the process in altering the index of refraction.

FIG. 4 is a graphical plot showing the measured index profiles. The dashed line is the profile before heating and the solid line is after heating. The resulting index change in the core glass was $\Delta n=0.006$. It is noteworthy that the index of the outer P-F doped cladding material ($11 < r < 20$ μm) also increased significantly during the heating, demonstrating that heat induced index changes can occur in glasses other than those doped with $GeO_2$.

EXAMPLE 2

Figure 5:
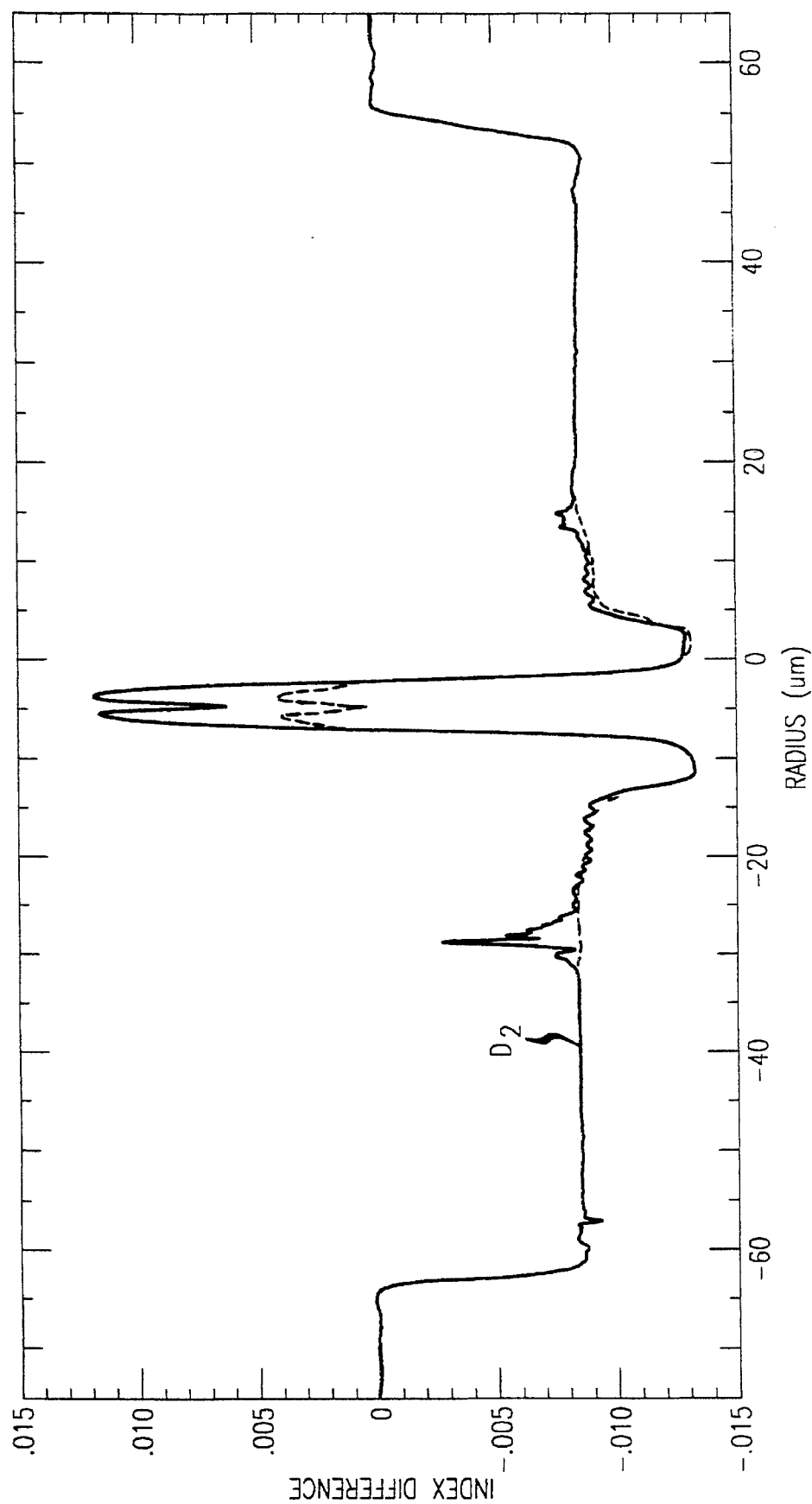

A length of similar fiber was loaded with 2.1 mole % $D_2$ and flame heated. The before and after heating refractive index profiles are shown in FIG. 5. The resultant index change for the core glass was $\Delta n=0.0075$. This demonstrates that either $H_2$ or $D_2$ can be used to achieve index changes. The advantage of $D_2$ instead of $H_2$ is that $D_2$ avoids the formation of OH, and thus avoids optical losses due to OH absorption. $H_2$, on the other hand, is cheaper than $D_2$ and it is easier to monitor by monitoring OH peak strength. Heating fibers which did not contain dissolved $H_2$ or $D_2$ did not cause measurable index changes.

It is to be understood that the above-described specific embodiments are illustrative of only a few of the many possible specific embodiments which can represent applications of the principles of the invention. Numerous and varied other applications of the inventive process can be readily devised by those skilled in the art without departing from the spirit and scope of the invention.

We claim:

1. A method for increasing the index of refraction of selected portions of a body comprising glass comprising the steps of:

providing a body comprising glass;

diffusing hydrogen or deuterium into at least the portions of said glass whose refractive index is to be increased wherein said diffusing is effected by exposing said glass to said hydrogen or deuterium at a temperature in the range 21°–150° C.; and locally selectively heating said portions of said glass to a temperature greater than about 500° C. to selectively increase the refractive index of said portions.

2. The method of claim 1 wherein said diffusing is effected by exposing said glass to said hydrogen or deuterium at a pressure in the range 14–11,000 p.s.i.

3. The method of claim 1 wherein said body comprising glass is an optical fiber.

4. The method of claim 1 wherein said body comprising glass comprises a substrate and a planar layer of glass on said substrate.

5. The method of claim 1 wherein said locally selectively heating is by infrared radiation.

6. The method of claim 1 wherein said glass is silica doped with $GeO_2$ in the range 3–20 mole percent.

* * * * *